United States Patent [19]
Norton

[11] Patent Number: 4,592,077
[45] Date of Patent: May 27, 1986

[54] NRZ DIGITAL DATA RECOVERY

[75] Inventor: Jerry J. Norton, Bartlesville, Okla.

[73] Assignee: Phillips Petroleum Company, Bartlesville, Okla.

[21] Appl. No.: 565,252

[22] Filed: Dec. 23, 1983

[51] Int. Cl.[4] .......................... H04L 7/02; H03D 3/24
[52] U.S. Cl. ...................................... 375/110; 375/120
[58] Field of Search ...................... 325/110, 119, 120; 307/511; 329/50

[56] References Cited

U.S. PATENT DOCUMENTS

| 4,321,483 | 3/1982 | Dugan | 375/120 |
| 4,371,975 | 2/1983 | Dugan | 375/120 |
| 4,380,815 | 4/1983 | Clendening | 375/120 |
| 4,385,396 | 5/1983 | Norton | 375/110 |

Primary Examiner—Douglas W. Olms
Assistant Examiner—Wellington Chin
Attorney, Agent, or Firm—French & Doescher

[57] ABSTRACT

The clock signal required for demodulation of a received NRZ digital data stream is generated by detecting each transition across a reference axis made by the received NRZ digital data stream. This transition data is then utilized to change the voltage applied to a voltage controlled oscillator. The change in the voltage applied to the voltage controlled oscillator causes the frequency of the output from the voltage controlled oscillator to change. The change in the frequency of the output of the voltage controlled oscillator adjusts the period of the clock signal until the clock signal is synchronized with the transition data at which time it may be used to demodulate the recieved NRZ digital data.

8 Claims, 7 Drawing Figures

NRZ DIGITAL DATA RECOVERY

This invention relates to demodulating non-return-to-zero (NRZ) digital data. In one aspect this invention relates to method and apparatus for generating a clock signal which may be used to demodulate NRZ digital data.

As used herein, the term "NRZ digital data" refers to a code form having two states, termed, "zero" and "one", and having no neutral or rest condition. The waveform may cross a neutral axis but the information is contained in the state of the waveform. Many different communication systems utilize an NRZ digital data code form.

As transmitted, NRZ digital data will remain in one of two states for a set period of time which will be referred to hereinafter as the "bit" period. At the end of the bit period, the waveform may shift to the second state or remain in the first state. NRZ digital data may be demodulated by integrating the received signal for the bit period. The integration is generally under the control of a clock signal which has a period (referred to hereinafter as the "clock period") the same as the bit period. If the clock signal is not synchronized with the received NRZ data, the integration may begin at the wrong time and an excessive error rate will result. It is thus an object of the invention to provide method and apparatus for generating a clock signal which is synchronized with the received NRZ data and thus may be utilized to demodulate NRZ digital data.

In accordance with the present invention, method and apparatus is provided for generating a clock signal which has a period equal to the bit period at which an NRZ digital data stream was transmitted and which is synchronized with the received NRZ digital data stream. The clock signal is utilized to clock an integrator or other suitable detector which is utilized to demodulate the received NRZ digital data stream. Errors are substantially reduced because the integration (detection) will be begun at the correct time.

In general, the required clock signal may be generated by detecting each transition across the reference axis made by the received NRZ digital data stream. This transition data is then utilized to change the voltage applied to a voltage controlled oscillator. The change in the voltage applied to the voltage controlled oscillator causes the frequency of the output from the voltage controlled oscillator to change. The change in the frequency of the output of the voltage controlled oscillator adjusts the period of the clock signal until the clock signal is synchronized with the transition data which is the desired result.

Other objects and advantages of the invention will be apparent from the foregoing brief description of the invention and the claims as well as the detailed description of the drawings in which:

The invention is described in terms of particular circuitry for demodulating NRZ digital data and is also described in terms of particular circuitry for generating the clock signal utilized to clock an integrator. The invention is, however, applicable to different circuits which accomplish the functions required by the present invention. The invention is also applicable to different detection systems if such demodulation systems require the use of a synchronized clock signal to recover information in a received waveform. Also a simpler filter than an integrator (a matched filter) could be utilized for a detector.

Figure 1:
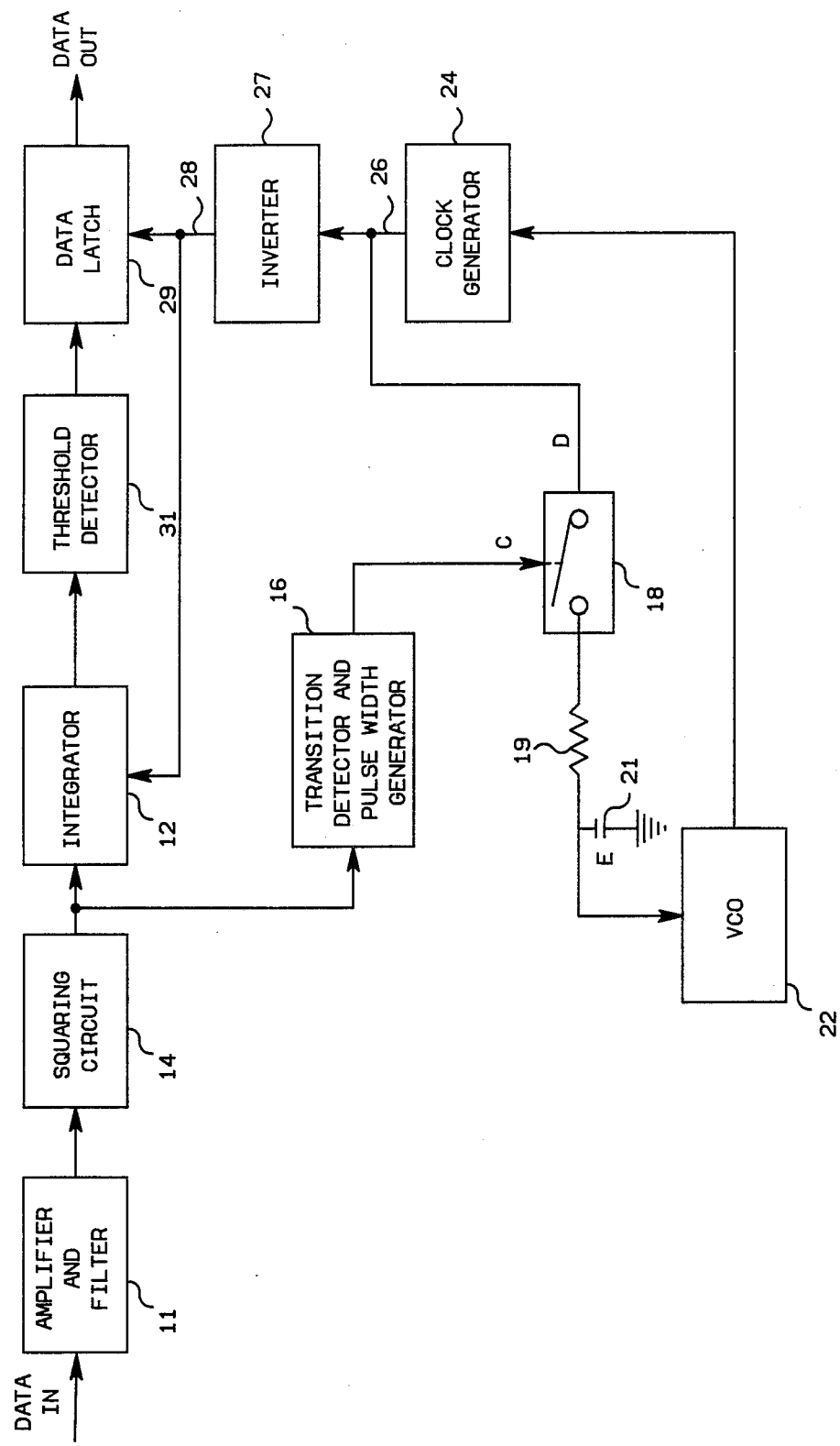
FIG. 1 is a diagrammatic illustration of the circuitry utilized to recover distorted NRZ digital data in accordance with the present invention.

Referring now to the drawings and in particular to FIG. 1, received NRZ digital data is provided to the amplifier and filter 11. The amplifier and filter is utilized to precondition the signal to the correct level or amplitude for optimum circuit operation. Also, if the received signal contains out-of-band frequency components that could cause improper circuit operation, these out-of-band signal components are filtered. The use of the amplifier and filter 11 is not required but is desirable to minimize the error rate.

The output signal from the amplifier and filter 11 is provided to squaring circuit 14. If it is assumed that the data transmitted was one zero one zero one zero, then the received data supplied to the squaring circuit 14 might have the waveform illustrated in FIG. 2. The squaring circuit 14 is utilized to make a general decision as to whether the received signal is a "one" or a "zero". The squaring circuit 14 will output a signal having the form of a "squared up" received data signal. The output from the squaring circuit 14 is provided to the transition detector and pulse width generator 16 and the integrator 12.

Figure 2:
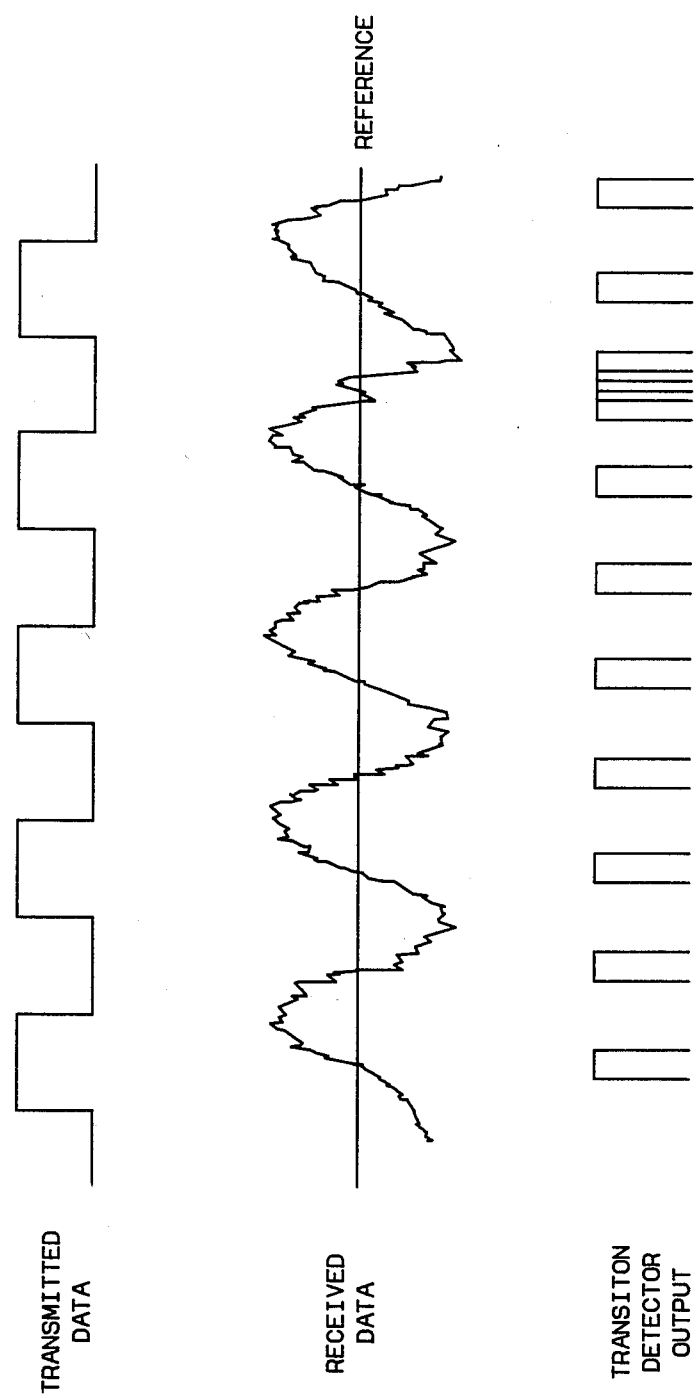
FIG. 2 is an illustration of the waveform of the transmitted data, received data and transition detector and pulse width generator 16 output.

The transition detector and pulse width generator 16 outputs a pulse having a predetermined width each time the squaring circuit output makes a transition through a reference level. If the reference level were as illustrated in FIG. 2, the output from the transition detector would be as illustrated in FIG. 2 for the assumed received waveform. Essentially, the output of the transition detector will be periodic if the received waveform makes a transition each bit period. The period is the same as the clock period for the transmitted data. If the received waveform does not make a transition each bit period (as would be typical), then the output of the transition detector 16 would not be periodic but each output pulse would occur at substantially some multiple of the bit period. It is noted that because of noise, additional pulses may be provided from the transition detector but, in general, the pulses occur at some multiple of the bit period. If the pulses do not occur at substantially some multiple of the bit period, it is generally not possible to recover the transmitted data without a significant number of errors occurring.

Figure 3:
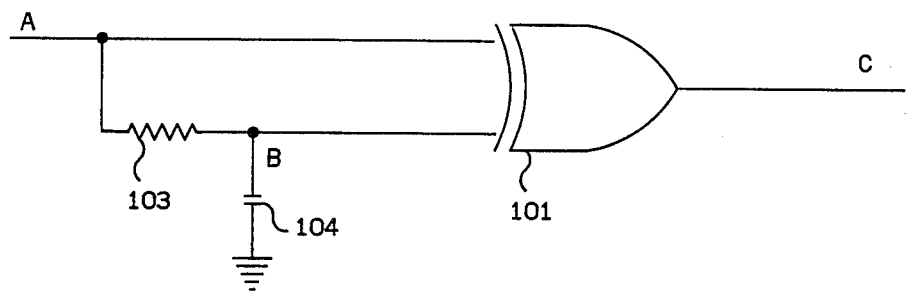
FIG. 3 is a detailed schematic of the transition detector and pulse width generator 16 illustrated in FIG. 1.

The operation of the transition detector and pulse width generator 16 is illustrated more fully by the simplified circuit illustrated in FIG. 3. Referring now to FIG. 3, signal A is the output from the squaring circuit 14. Signal A is supplied directly at the first input of the Exclusive-Or gate 101 and is also supplied through the RC combination of resistor 103 and capacitor 104 to the second input of the Exclusive-Or gate 101.

Figure 4:
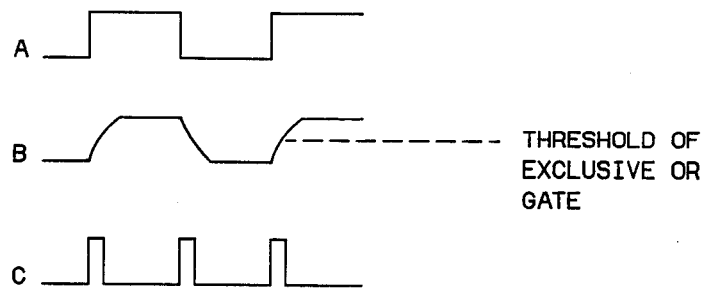
FIG. 4 is an illustration of the waveforms associated with the transition detector and pulse width generator 16 illustrated in FIG. 3.

If it is assumed that signal A has the ideal form illustrated in FIG. 4, then the signal at point B will have the form illustrated in FIG. 4. For signals A and B illustrated in FIG. 4, the output from the Exclusive-Or gate 101 will have the form illustrated as signal C in FIG. 4. The waveform position where the output from the Exclusive Or gate 101 switches is determined by the input voltage threshold level of the Exclusive-Or gate 101. The width of the pulses of signal C is a function of the RC time constant determined by the resistance of resistor 103 and capacitance of capacitor 104.

Referring back to FIG. 1, the pulse outputs from the transition detector and pulse width generator 16 are provided as an input to the switch 18. It is noted that use of the squaring circuit 14 is not required so long as the transition detector and pulse width generator 16 can provide the transition data required by the switch 18. The switch 18 is closed for the period of time that the pulse from the transition detector and pulse width generator 16 is high. This allows the clock signal 26, which is generated as described hereinafter, to be supplied to the RC combination made up of resistor 19 and capacitor 21. Depending upon the state of the clock signal 26, the voltage on the capacitor 21 will be increased or decreased by a small amount. The voltage on the capacitor 21 is the input voltage to the voltage controlled oscillator 22.

The operation of the switch 18 in conjunction with the capacitor 21 is more fully illustrated by reference to FIG. 5. If signal D is assumed to be the clock signal and signal C the output from the transition detector and pulse width generator 16, then the voltage E on the capacitor 21 will be increased each time signal C goes high because signal C is going high while the clock D is positive. Charge on the capacitor 21 will be maintained because the circuit is open when switch 18 is opened which provides a very high impedance.

The increasing voltage at the input of the voltage controlled oscillator will have the effect of decreasing the frequency of the voltage controlled oscillator. This will have the effect of increasing the period of the clock signal D. As is illustrated in FIG. 5, as this increase in the period of clock signal D occurs, the transition pulse C will approach the leading edge of the clock signal D.

When the pulse signal C passes the leading edge of the clock signal D, switching will occur while the clock signal D is negative which will discharge the capacitor by a small voltage. As the voltage on the capacitor goes lower, the frequency of the voltage controlled oscillator 22 is increased which has the effect of decreasing the period of the clock D.

This process continues until the transition pulse C occurs exactly on a transition of the clock D in such a manner that the same amount of voltage is added to and subtracted from the charge on the capacitor 21. When this occurs the clock D will lock onto the transition pulse C which is the desired effect. The clock signal D may thereafter experience some jitter but will essentially remain synchronized with the received data.

Figure 5:
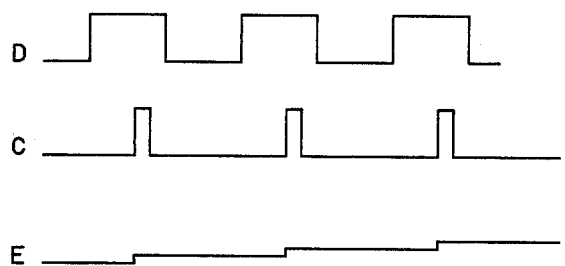
FIG. 5 is an illustration of the waveforms associated with the switch 18 illustrated in FIG. 1.

As was previously stated in the discussion of FIG. 5, the output from the voltage controlled oscillator 22 is utilized to drive the clock generator 24 which is essentially a counter. The clock generator 24 will output a clock signal 26 having a period equal to the bit period of the transmitted data in the manner described in FIG. 5. It is noted that the output from the voltage controlled oscillator could be utilized directly if the frequency were suitable but it is generally necessary to divide the output from the voltage controlled oscillator 22 because of the high frequency of the voltage controlled oscillator 22.

The clock signal 26 from the clock generator 24 is supplied as an input to the switch 18 as has been previously described and is also provided as an input to the inverter 27. The inverter 27 inverts the clock signal 26 and supplies signal 28 as the clock to the integrator 12 and the data latch 29.

The integrator 12 is utilized to integrate the received data signal over a particular period of time which is determined by the period of the clock signal 26. The operation of such an integrator is well known in the art of communication systems. Essentially, if the received data signal for a bit period is considered a curve, the integrator determines the area under the curve with respect to a particular reference, such as the reference level illustrated in FIG. 2.

The output of the integrator 12 is provided to the threshold detector 31. The threshold detector 31 is utilized to determined whether the output level of the integrator 12 is high enough to be a "one" or low enough to be a "zero". The decision of the threshold detector 31 is provided to the data latch 29 to be stored by a "latch" command. The thus stored data may be output as required. The present invention is particularly applicable to use in repeater stations and thus the output from the data-latch 29 could be provided to a transmitter for transmission to another repeater station or a final destination as desired.

Immediately after the latch command causes the output of the threshold detector 31 to be stored in the data latch 29, a dump command causes the integrator capacitor to discharge thus allowing the integrator to start from zero on the next bit of information.

The latch command is the leading edge of pulse 28. In general, data will be latched when the pulse 28 level has reached between 30 percent and 70 percent of its maximum value. The integrator 12 is reset simultaneously with data latch.

In summary, the received data may be severely distorted by noise but will, in general, have a transition periodicity (the bit period or multiples of the bit period) which can be detected by the transition detector and pulse width generator 16. This periodicity provides an indication of the initial bit period used to transmit the data. By adjusting the clock signal utilized to clock the integrator 12 in such a manner that the clock signal is synchronous with the output of the transition detector and pulse width generator 16, a correct period of integration is provided and the error rate is significantly reduced as compared to detection systems in which shifting of the integrator clock signal is not available.

Figure 6:
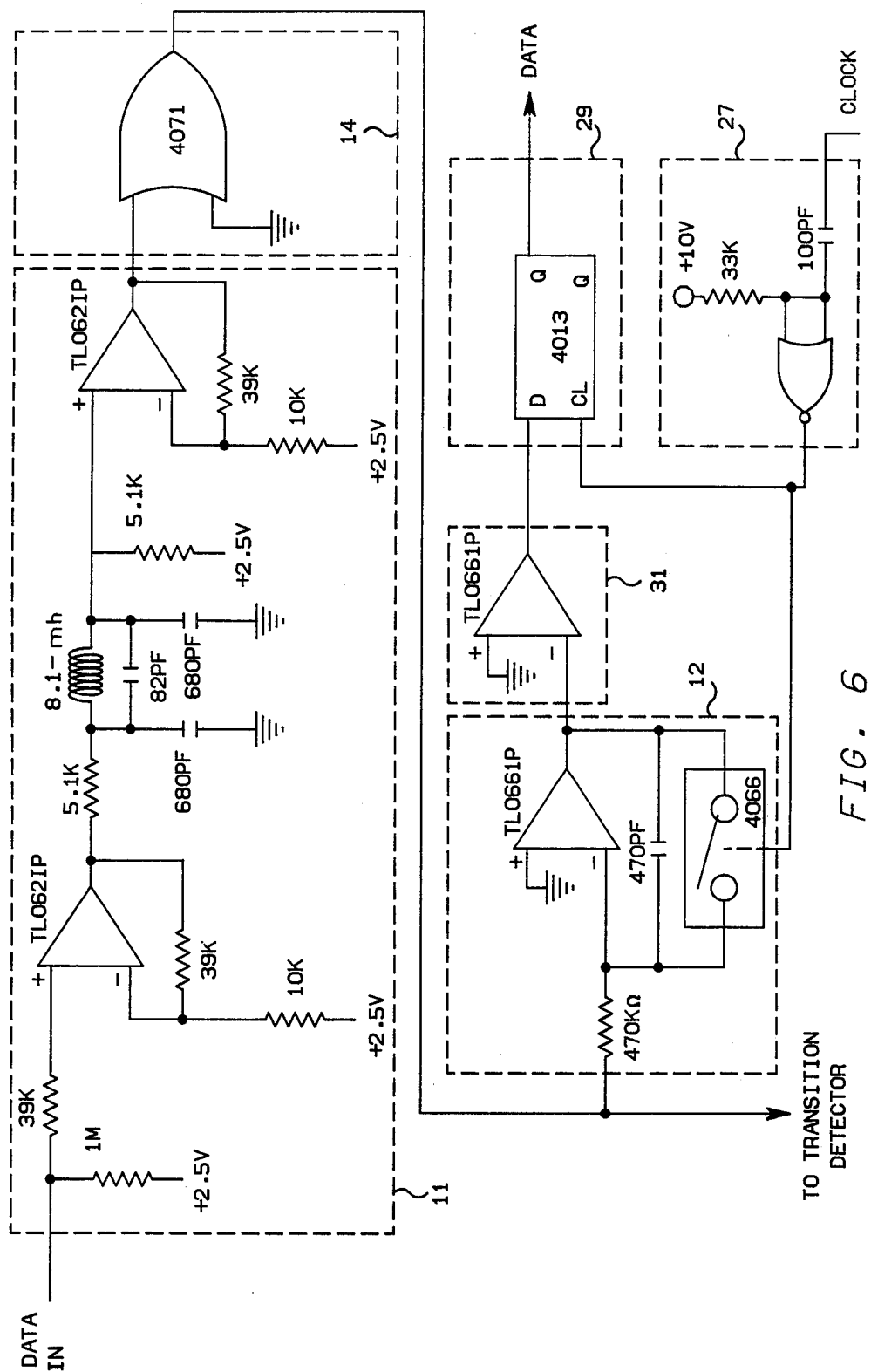
FIGS. 6 and 7 in combination are a schematic diagram of electrical circuitry which may be utilized to perform the functions illustrated in FIG. 1.
Figure 7:
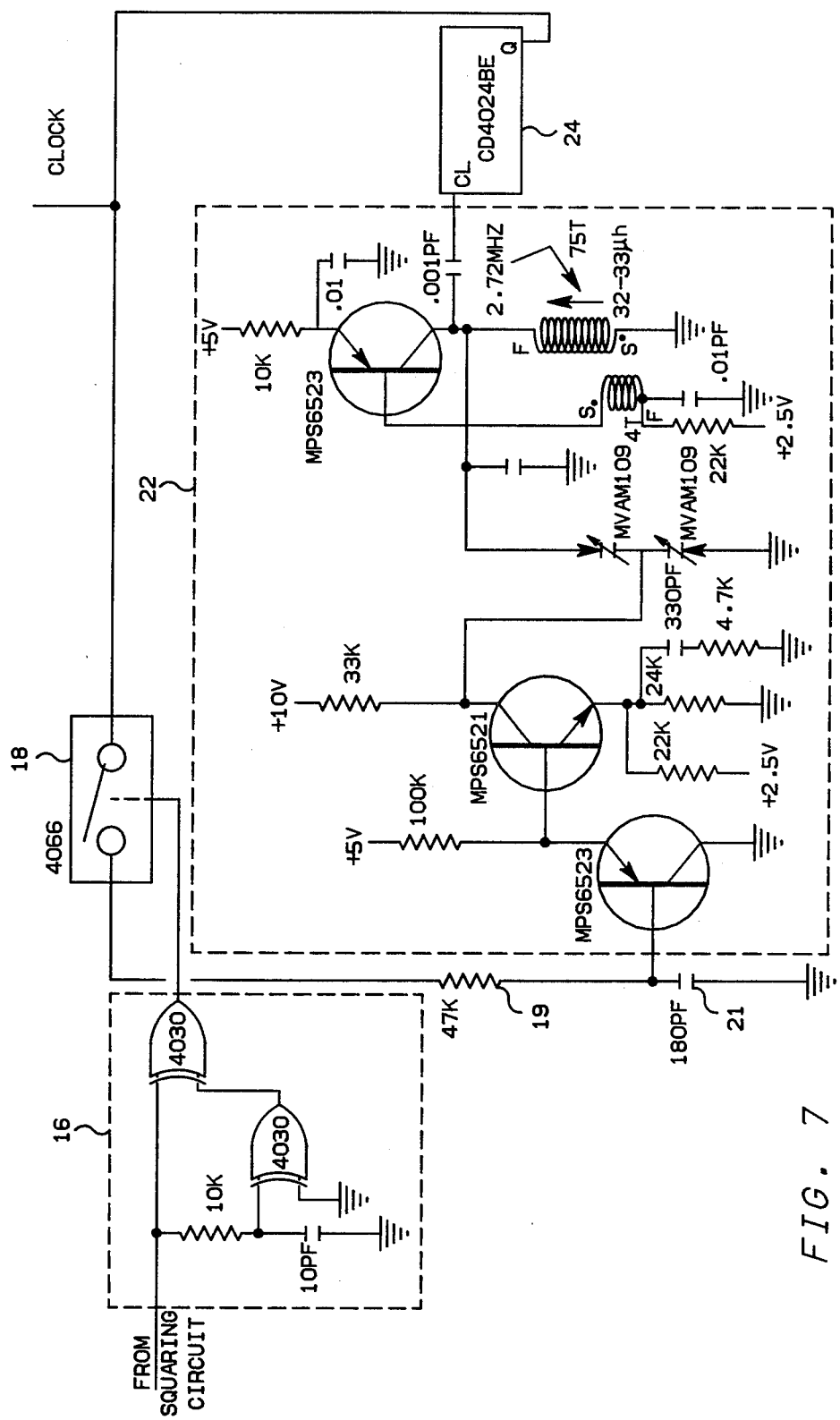

A circuit which may be utilized to implement the functions illustrated in FIG. 1 is illustrated in FIGS. 6 and 7. The circuit is preferably implemented utilizing 4000 Series CMOS chips. These chips may be obtained from a number of manufacturers such as RCA, Motorola, Fairchild, and National. Also, the operational amplifiers may be obtained from a number of manufacturers. The function of each of the chips is fully described by literature supplied by the manufacturers of these chips and the manner in which the circuit operates would be obvious to one skilled in the art of electronics.

The amplifier and filter 11, squaring circuit 14, integrator 12, threshold detector 31, data latch 29 and inverter 27 are illustrated in FIG. 6. The transition detector and pulse width generator 16, switch 18, resistor 19, capacitor 21, voltage controlled oscillator 22 and clock generator 24 are illustrated in FIG. 7.

Some power supplies and other conventional circuitry required by the various chips have not been illustrated in FIG. 3 for the sake of simplicity. Again, such power supplies and additional circuitry required are specified by the manufacturers and all well known to those skilled in the art of electronics.

The invention has been illustrated and described in terms of a preferred embodiment as illustrated in FIGS. 1–7. As has been previously discussed, reasonable variations and modifications are possible within the scope of the disclosure and the appended claims to the invention.

That which is claimed is:

1. Apparatus for generating a clock signal which has a period equal to the bit period of received non-return to zero (NRZ) digitial data and which is synchronized with said received NRZ digital data comprising:
   a transition detector and pulse width generator;
   means for providing said received NRZ digital data to said transition detector and pulse width generator, wherein said transition detector and pulse width generator provides an output pulse having a desired predetermined width each time said received NRZ digital data makes a state transition;
   a switch having first and second terminals;
   means for connecting a clock signal to a first terminal of said switch;
   a capacitor;
   means for electrically connecting said capacitor between the second terminal of said switch and ground so that said capacitor is charged through said switch;
   a voltage controlled oscillator;
   means for electrically connecting said voltage controlled oscillator to
   said capacitor wherein the voltage on said capacitor is equal to the voltage supplied to the input of said voltage controlled oscillator;
   a clock generator;
   means for providing the output signal from said voltage controlled oscillator to the clock input of said clock generator, wherein said clock generator generates said clock signal; and
   means for providing said output pulse as a control signal to said switch, wherein said switch is closed periodically in response to said pulse, wherein the closing of said switch causes a change in the voltage on said capacitor if said output pulse is not synchronized with said clock signal and wherein the change in the voltage on said capacitor causes a change in the frequency of the output signal from said voltage controlled oscillator so as to adjust the period of said clock signal in such a manner that said clock signal is synchronized with said output pulse.

2. Apparatus in accordance with claim 1 additionally comprising:
   integrator means;
   means for providing said received NRZ digital data to said integrator means; and
   means for controlling the integration of said received NRZ digital data by said integrator means in response to said clock signal in such a manner that the integration of said received NRZ digital data for each bit period is begun at substantially the beginning of each bit period.

3. Apparatus in accordance with claim 2 wherein said means for providing said received NRZ digital data to said transition detector and pulse width generator comprises:
   a squaring circuit; and
   means for providing said received NRZ digital data through said squaring circuit to said transition detector and pulse width generator.

4. Apparatus in accordance with claim 2 additionally comprising:
   a threshold detector means;
   means for providing the output from said integrator means to said threshold detector means, wherein said threshold detector means provides an output signal which is representative of the state of said received NRZ digital data for a particular bit period;
   a data latch means; and
   means for providing the output from said threshold detector means to said data latch means to thereby store the state of said received NRZ digital data for a particular bit period.

5. Apparatus in accordance with claim 4 wherein data is stored in said data latch means in response to said clock signal.

6. A method for establishing a clock signal which has a period equal to the bit period for received non-return to zero (NRZ) digital data and which is synchronized with said received NRZ digital data comprising the steps of
   establishing a transition signal having a desired predetermined pulse width which pulses each time said received NRZ digital data makes a state transition;
   supplying a clock signal to a first terminal of a switch;
   electrically connecting a capacitor between the second terminal of said switch and ground;
   electrically connecting a voltage controlled oscillator to said capacitor, wherein the voltage on said capacitor is equal to the voltage supplied to the input of said voltage controlled oscillator;
   generating said clock signal in response to the output signal from said voltage controlled oscillator; and
   closing said switch periodically in response to said transition pulse, wherein the closing of said switch causes a change in the voltage of said capacitor if said transition pulse is not synchronized with said clock signal and wherein the change in the voltage on said capacitor causes a change in the frequency of the output signal from said voltage controlled oscillator so as to adjust the period of said clock signal in such a manner that said clock signal is synchronized with said transition pulse.

7. A method in accordance with claim 6 additionally comprising the steps of:
   (a) integrating said received NRZ digital data for a bit period;
   (b) controlling the integration of said received NRZ digital data in response to said clock signal in such a manner that the integration of said received NRZ digital data is in a first state corresponding to a logic one or low enough to indicate that said received NRZ digital data is in a second state corresponding to a logic zero.

8. A method in accordance with claim 7 additionally comprising the steps of:
   storing the results of said detection;
   destroying the results of said integration; and
   repeating steps a–b for a new bit period.

* * * * *